Nov. 27, 1934.  A. O. ABBOTT, JR  1,981,893
TIRE BEAD AND METHOD FOR MAKING THE SAME
Filed June 11, 1931    2 Sheets-Sheet 1

INVENTOR
ADRIAN O. ABBOTT, JR.
BY
ATTORNEY

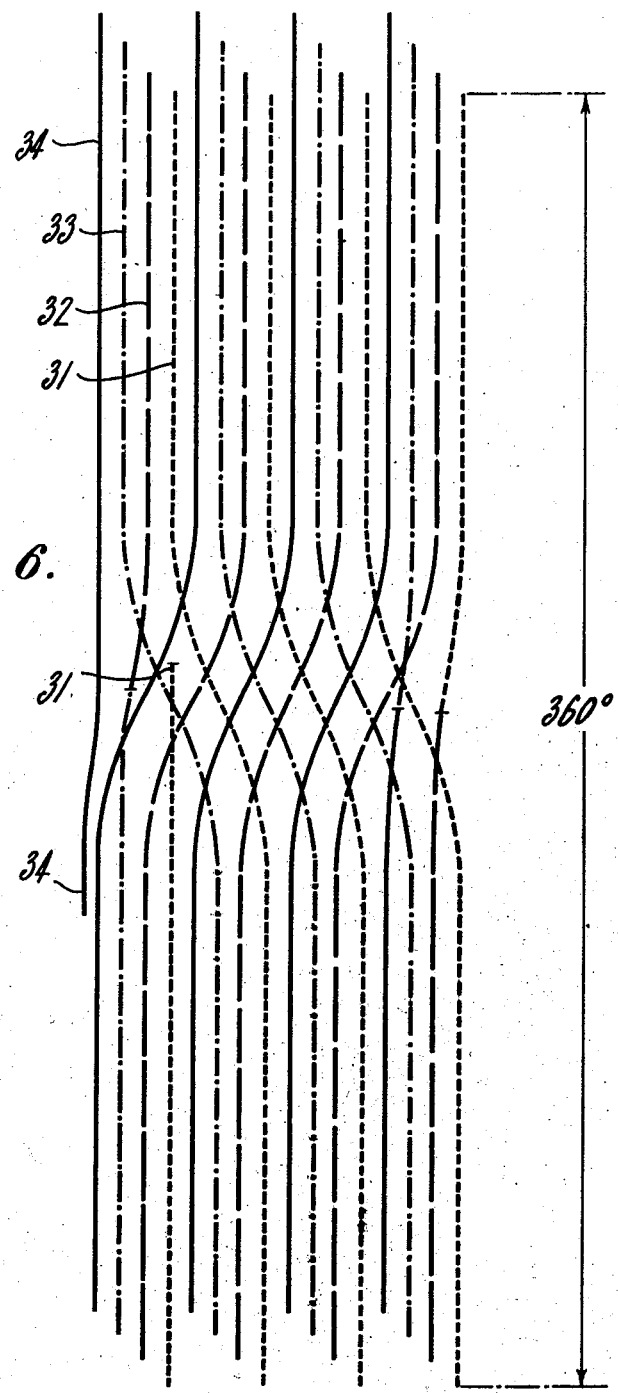

Patented Nov. 27, 1934

1,981,893

UNITED STATES PATENT OFFICE 1,981,893

TIRE BEAD AND METHOD FOR MAKING THE SAME

Adrian O. Abbott, Jr., Grosse Point Park, Mich., assignor to Morgan & Wright, Detroit, Mich., a corporation of Michigan Application June 11, 1931, Serial No. 543,612

8 Claims. (Cl. 154—14)

My invention relates to tire beads and methods for making the same.

In the manufacture and use of tire beads, two general types have heretofore been common. The first type consists of a plurality of convolutions of bare wire, the ends of which are joined by ferrules through a brazing or soldering operation after which the whole is covered with rubber composition or rubberized fabric. The second type, which may be termed a multiple-strand type, comprises a plurality of strands laid side by side in a rubber or rubber composition body. The assembly is substantially in the form of a rubber tape. The strands in the tape may be interwoven with fine connecting wires, if desired, or they may be parallel and connected only by the rubber composition, as desired.

The beads of the first type, after being wound on a drum, are run over grooved pulleys so as to equalize the strains in and compact the separate coils to more closely conform to the cross-section of the completed bead wire. This is done before a rubber covering is applied.

Among the disadvantages of the first type of bead wire is the soldering or brazing operation. The joining of the ends, besides requiring an additional operation, is objectionable in that the cross-over at the ends interferes with the equalization of the strains in the coil, and results in unevenness and stiffness at the area where the ends are joined. The application of the rubber or rubberized fabric to the bare wire is not very satisfactory as the rubber or rubberized fabric tends to adhere only to the outer surfaces of the bead and the individual convolutions thereof, rather than to uniformly cover all surfaces of the several convolutions. Such non-uniform embedding of the wires in the rubber tends to cause the loosening of the convolutions relative to the coating to such an extent that tire break-downs from this cause are not unusual.

The multiple-strand or tape form of bead is disadvantageous because there are as many wire ends on the inside and on the outside of the bead as there are strands in the tape. As such tapes usually have three or four ends terminating at one place, there is a tendency to produce sharp corners at the ends of the tape. To remedy the sharp corners it is necessary to apply extra rubber stock on the top of the bead in order to properly taper it off into the side wall of the tire, also the presence of so many strand ends at one place multiplies the destructive action of the individual ends so that they tend to break loose from the bead and penetrate the carcass.

Another disadvantage of the multiple-strand or tape type of bead is that there are in effect as many single coils in each bead as there are separate strands, since the convolutions of each strand are all in the same plane, or in a superimposed relation. As the same amount of overlap must be provided for each strand end, the use of a plurality of strands increases the amount of wire utilized in the overlapping area. The wire in the overlapped portion of such a bead sometimes runs as high as 5% of the total wire utilized in the bead. Multi-strand or tape beads cannot be made in irregular cross-sectional shapes, such as circular, semicircular, or the like, since the tapes must be built up with substantially rectangular cross-sections.

The tape type of beads are relatively inflexible when an attempt is made to change their shape. This is particularly important when tires are built by the flat band process, and it is subsequently desired to shape the tire bands by a vacuum or super-atmospheric process. Due to the inflexibility of such multi-strand bead wires their use is substantially limited to the "shoulder" type of building drums.

I provide a tire bead in which a single strand of rubber covered wire is given the desired number of convolutions. The wire is preferably of a small gage, in the order of .037 inch, so that the ends of the wire may be secured by fabric bands as distinguished from a soldering or brazing operation. The convolutions of the wire are precovered with unvulcanized rubber so that they have a uniform rubber covering which also tends to hold the convolutions together. When the bead is used in a flat-built tire band the individual convolutions are free to move relative to each other whereby the bead may accommodate itself to the changes of shape of the band. As there are only two ends to be overlapped there is a distinct saving in the amount of wire used over a multi-strand or tape type of bead.

My bead may be wound in a substantially rectangular shape, or in rounded or irregular shapes, as desired. When the bead is wound into a substantially rectangular shape in cross section, the convolutions of adjacent layers are given oppositely inclined spiral directions so that the convolutions tend to cross each other as distinguished from being laid one on top of the other or in a single plane as in a multi-strand bead. With my bead it is possible to obtain an indivisible number of convolutions which is impossible in the case of the multi-strand bead. With a multi-strand bead the convolutions are always a multiple of the number of strands used. When the bead is placed under pressure, as in a mold during a vulcanizing operation, the strands of the convolutions are capable of moving, adjusting, and nesting themselves to naturally assume a regular and uniform bead outline.

The accompanying drawings illustrate sections of beads embodying my invention and apparatus for making the same, in which:—

Fig. 6 is a diagrammatical developed view of a bead showing the relative positions of the convolutions in the several layers.

Figure 1:
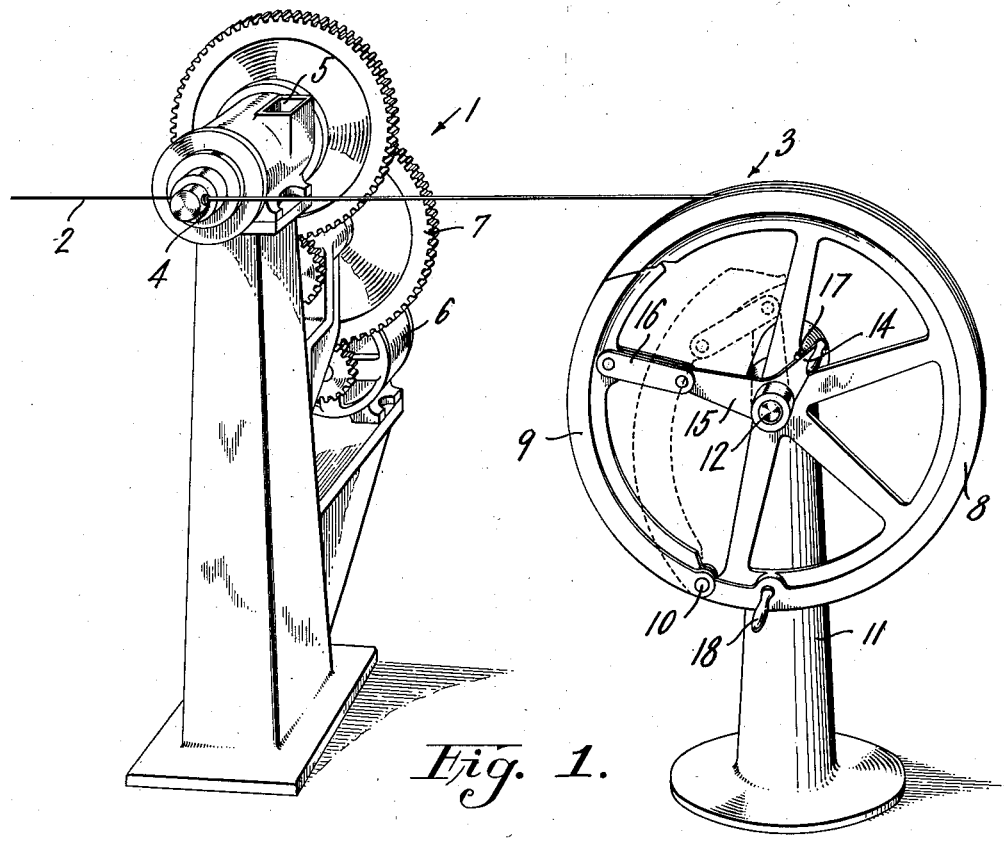
Figure 1 is a side elevational view of apparatus for applying a rubber covering to a single strand of wire and for forming the wire into a bead.

Referring to the drawings, a machine 1 for applying a rubber covering to a single bead wire 2 is placed in cooperative relation to a grooved rim or wheel 3 for forming a tire bead or bead ring. The machine 1 may be of any conventional type of insulating, tubing or extruding machine in which a passageway 4 is provided for the wire 2. Covering material is fed into the machine at an opening 5. A motor 6 and a gear train 7 are provided for continuously operating the machine 1.

The stock that may be used in the machine 1 includes rubber, gutta percha and compounds thereof. It is to be understood that a machine for wrapping rubberized fabric around the wire 2 may be substituted for the machine 1, if desired. Also the wire may be covered by a latex process in so far as the present invention is concerned. The rubber covering is preferably in an unvulcanized but vulcanizable condition so that the bead ring is in a "green" condition as the term is understood in the art, and may be vulcanized in situ in the finished tire. The machine 1 is therefore diagrammatic of any form of apparatus for covering the wire 2.

The wheel 3 comprises a rigid segment 8 and a collapsible segment 9 which is secured to the rigid segment by a pivot 10. The wheel is mounted on a pedestal 11 by a shaft 12. For manipulating the collapsible segment 9 I provide a handle 14 loosely mounted on a shaft 12 supporting the wheel 3 and having an extension 15 cooperating with links 16 attached near the free end of the segment 9 so as to constitute a toggle joint. A pin 17 on a spoke of the wheel 3 constitutes a stop for the handle 14 after the toggle has moved past dead center to extend the segment 9. A handle 18 is provided for rotating the wheel 3, although it is to be understood that it may be motor driven, if desired. Upon collapsing the segment 9 a bead ring formed on the wheel 3 may be removed. The bead rings, after being taped, as hereafter described, may be placed on equalizing pulleys, if desired.

Figure 2:
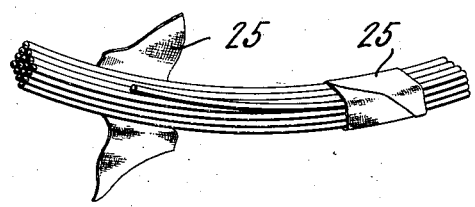
Fig. 2 is a perspective view of a portion of a rectangular bead in cross-section.
Figure 4:
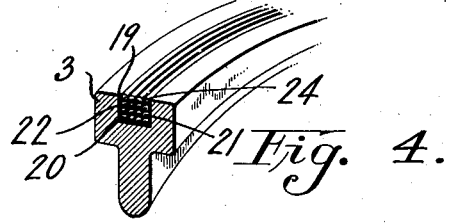
Fig. 4 is a cross-sectional view of a portion of a groove for forming a bead, such as is shown in Fig. 2.

Referring to Figs. 2, 4 and 6, when it is desired to build a bead which is substantially rectangular in cross section, the wheel 3 is provided with a substantially rectangular groove 19 into which the wire 2 is wound to form a plurality of layers 20, 21, 22 and 24. The convolutions of the different layers may be given opposite spiral inclinations by starting the end of the wire against or along side of one of the flanges of the groove so that the convolutions of adjacent layers cross each other. The intercrossing connection of the convolutions of the single strand of wire produces a finished bead of great unity in that each convolution contacts with and adheres to a greater number of convolutions than is possible with a parallel concentric winding. This is particularly shown in Fig. 6 where the dotted line 31 illustrates the several convolutions of the lower layer, that is the layer laid in the bottom of the forming groove. The dash line 32 represents the convolutions of the second layer. The dot and dash line 33 represents the convolutions of the third layer, and the solid line 34 represents the convolutions of the fourth layer. It is to be understood that other layers may be added if necessary. As is clearly shown in the center of the figure, the convolutions of the several layers are oppositely inclined and cross over the convolutions of the inner or lower layer or layers so as to hold the inner convolutions against separation. It will be understood that Fig. 6 is a diagrammatic view rather than a true view, since it is substantially impossible to illustrate the exact inclination and interfitting of a considerable number of convolutions of wire. After the bead is removed from the wheel 3 the ends are secured by fabric strips 25, as shown in Fig. 2. The fabric may be placed by hand or by machine. A suitable type of machine for this purpose is shown in Letters Patent No. 1,944,142 granted to Abbott and McNeil on January 16, 1934. A commercial machine for making the bead wires is shown in the Wickle Patent No. 1,964,445 issued June 26, 1934.

If relatively light wire, such as wire of the order of .037 inch is used, I have found that it is not necessary to solder the ends of the coil. The fabric bands hold such a wire and prevent it from working through the carcass. If a materially heavy wire is used, there is danger of the free ends of the wire breaking away and puncturing the tire unless they are soldered or brazed in place. Such a soldering or brazing operation is very difficult where the wire is previously rubber coated.

Figure 3:
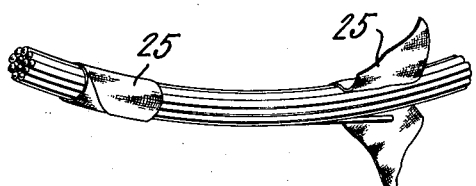
Fig. 3 is a similar view of a bead having a rounded contour.
Figure 5:
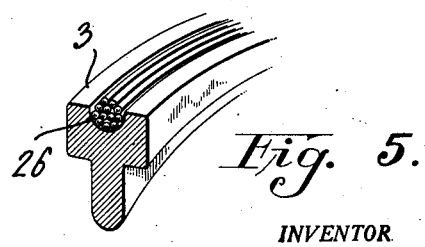
Fig. 5 is a similar view of a groove for forming the bead shown in Fig. 3.

Referring to Figs. 3 and 5, a rounded or irregular shaped bead may be produced by providing the rim 3 with a suitably shaped groove 26. With a groove semicircular in cross section, the convolutions of the bead are wound in irregular fashion but they ultimately tend to assume a circular shape. The ends are secured by fabric strips 25.

A number of advantages of this type of bead have heretofore been pointed out, namely, its flexibility due to relative movement between the convolutions when a change of shape is desired, the ability to produce a bead having odd numbers of convolutions, the elimination of a soldering or brazing operation, the elimination of stiff joint areas in the bead, a saving in the amount of wire required for overlapping ends, and an absence of sharp slab ends in the bead, such as are at present at the ends of multi-strand tapes.

As an example of the economy of a single strand bead over a multi-strand bead, due to the elimination of overlapping wire ends, the following mathematical values are given. Assuming that the ends of the wire are overlapped for a distance of one foot, one foot of wire is used in the overlap. For a similar tape or multi-strand type of bead having four strands there would be a total overlap of four feet of wire. This comparison shows a saving of three feet of wire by the use of a single strand bead. The amount of wire thus used in the overlapping area of a bead using approximately 60 feet of wire will be about 5% of the length of the entire wire used in the bead. The elimination of a large number of overlapping wires results in a better tire sidewall than is produced from the multi-strand construction where a larger number of ends occur at a sharp edge.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A tire bead comprising a single strand of rubber covered wire laid in a plurality of layers of several convolutions each, the convolutions of adjacent layers extending in reverse spiral directions whereby the convolutions of the adjacent layers cross each other.

2. A tire bead comprising a single strand of wire having a covering of uncured rubber composition and being wound in a plurality of convolutions, the coverings of adjacent convolutions merging with each other and maintaining the convolutions of wire in spaced relation.

3. The method of forming a tire bead which comprises winding a layer of convolutions of a single strand of wire having a spiral inclination and then applying a second layer with its convolutions having a reverse spiral inclination to those in the first layer whereby the individual convolutions of adjacent layers cross each other.

4. The method of forming a tire bead which comprises covering a strand of wire with uncured rubber composition, winding the covered strand into a plurality of convolutions with the coverings of adjacent convolutions merging with each other and maintaining the convolutions of wire in spaced relation, and binding the free ends of said strand in place.

5. A green tire bead of predetermined shape comprising a single strand of wire sheathed with vulcanizable rubber composition having a plurality of helical windings in contiguous concentric relation to at least a second plurality of helical windings of opposite pitch, the ends of said strand being overlapped a distance of at least six inches, and means for holding the ends of said strand.

6. A green tire bead of predetermined shape comprising a single strand of wire sheathed with vulcanizable rubber composition having a plurality of helical windings in contiguous concentric relation to at least a second plurality of helical windings of opposite pitch, the ends of said strand being overlapped a distance of at least six inches, and means for holding the ends of said strand, adjacent helical windings of said strand being unconnected metallically excepting as they form part of said single strand of wire.

7. In a tire bead construction, a single strand only of vulcanizable rubber sheathed wire wound in a plurality of convolutions, the rubber separating the several convolutions of wire and when blended maintaining them in bonded and spaced relation.

8. A pneumatic tire having a bead of the construction set forth in claim 7 vulcanized therein.

ADRIAN O. ABBOTT, Jr.